United States Patent
Park et al.

(10) Patent No.: US 7,849,372 B2
(45) Date of Patent: *Dec. 7, 2010

(54) WRITE-ONCE RECORDING MEDIUM AND DEFECTIVE AREA MANAGEMENT METHOD AND APPARATUS FOR WRITE-ONCE RECORDING MEDIUM

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 476 days.

This patent is subject to a terminal disclaimer.

(21) Appl. No.: 11/902,590

(22) Filed: Sep. 24, 2007

(65) Prior Publication Data

US 2008/0019244 A1 Jan. 24, 2008

Related U.S. Application Data

(63) Continuation of application No. 10/670,374, filed on Sep. 26, 2003, now Pat. No. 7,289,404.

(30) Foreign Application Priority Data

Mar. 13, 2003 (KR) .......................... 10-2003-15634

(51) Int. Cl.
G11C 29/44 (2006.01)
G11C 29/50 (2006.01)

(52) U.S. Cl. ...................... 714/710; 714/718

(58) Field of Classification Search ........................ None
See application file for complete search history.

(56) References Cited

U.S. PATENT DOCUMENTS

| | | | |
|---|---|---|---|
| 4,558,446 A | 12/1985 | Banba et al. | |
| 4,733,386 A | 3/1988 | Shimoi et al. | |
| 4,807,205 A | 2/1989 | Picard et al. | |
| 4,963,866 A | 10/1990 | Duncan | |
| 5,065,388 A | 11/1991 | Roth et al. | |

(Continued)

FOREIGN PATENT DOCUMENTS

CN 1134017 A 10/1996

(Continued)

OTHER PUBLICATIONS

JIS handbook data processing for hardware, Japan, Japanese Standards Association Inc., Apr. 21, 1999, pp. 1064-1070.

(Continued)

*Primary Examiner*—Robert Beausoliel
*Assistant Examiner*—Dipakkumar Gandhi
(74) *Attorney, Agent, or Firm*—Birch, Stewart, Kolasch & Birch, LLP

(57) ABSTRACT

A method, apparatus and recording medium for managing defects are discussed. According to an embodiment, the method includes allocating at least one spare area to the recording medium, and at least one temporary defect management area to the spare area when a plurality of temporary defect management areas are to be separately provided; recording defect management information on a first temporary defect management area; and recording defect management information on a second temporary defect management area after the first temporary defect management area is full, the second temporary defect management area being allocated to the spare area.

15 Claims, 9 Drawing Sheets

U.S. PATENT DOCUMENTS

| | | | |
|---|---|---|---|
| 5,068,842 A | 11/1991 | Naito et al. | |
| 5,111,444 A | 5/1992 | Fukushima et al. | |
| 5,210,734 A | 5/1993 | Sakurai et al. | |
| 5,235,585 A | 8/1993 | Bish et al. | |
| 5,237,553 A | 8/1993 | Fukushima et al. | |
| 5,247,494 A | 9/1993 | Ohno et al. | |
| 5,319,626 A | 6/1994 | Ozaki et al. | |
| 5,404,357 A | 4/1995 | Ito et al. | |
| 5,442,611 A | 8/1995 | Hosaka et al. | |
| 5,448,728 A | 9/1995 | Takano et al. | |
| 5,475,820 A | 12/1995 | Natrasevschi et al. | |
| 5,481,519 A | 1/1996 | Hosoya et al. | |
| 5,495,466 A | 2/1996 | Dohmeier et al. | |
| 5,528,571 A | 6/1996 | Funahashi et al. | |
| 5,553,045 A | 9/1996 | Obata et al. | |
| 5,577,194 A | 11/1996 | Wells et al. | |
| 5,608,715 A | 3/1997 | Yokogawa et al. | |
| 5,666,335 A | 9/1997 | Horibe | |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi et al. | |
| 5,805,536 A | 9/1998 | Gage et al. | |
| 5,848,038 A | 12/1998 | Igarashi et al. | |
| 5,867,455 A | 2/1999 | Miyamoto et al. | |
| 5,878,020 A | 3/1999 | Takahashi | |
| 5,914,928 A | 6/1999 | Takahashi et al. | |
| 5,940,702 A | 8/1999 | Sakao et al. | |
| 6,058,085 A | 5/2000 | Obata et al. | |
| 6,118,608 A | 9/2000 | Kakihara et al. | |
| 6,138,203 A | 10/2000 | Inokuchi et al. | |
| 6,160,778 A | 12/2000 | Ito et al. | |
| 6,189,118 B1 | 2/2001 | Sasaki et al. | |
| 6,233,654 B1 | 5/2001 | Aoki et al. | |
| 6,292,445 B1 | 9/2001 | Ito et al. | |
| 6,341,109 B1 | 1/2002 | Kayanuma et al. | |
| 6,341,278 B1 | 1/2002 | Yamamoto et al. | |
| 6,373,800 B1 | 4/2002 | Takahashi et al. | |
| 6,405,332 B1 | 6/2002 | Bando et al. | |
| 6,414,923 B1 | 7/2002 | Park et al. | |
| 6,415,350 B2* | 7/2002 | Asoh | 711/103 |
| 6,447,126 B1 | 9/2002 | Hornbeck | |
| 6,466,532 B1 | 10/2002 | Ko et al. | |
| 6,469,978 B1 | 10/2002 | Ohata et al. | |
| 6,477,126 B1 | 11/2002 | Park et al. | |
| 6,480,446 B1 | 11/2002 | Ko et al. | |
| 6,493,301 B1 | 12/2002 | Park et al. | |
| 6,496,807 B1 | 12/2002 | Inokuchi et al. | |
| 6,529,458 B1 | 3/2003 | Shin et al. | |
| 6,542,450 B1 | 4/2003 | Park et al. | |
| 6,564,345 B1 | 5/2003 | Kim et al. | |
| 6,581,167 B1 | 6/2003 | Gotoh et al. | |
| 6,606,285 B1 | 8/2003 | Ijtsma et al. | |
| 6,615,363 B1 | 9/2003 | Fukasawa et al. | |
| 6,631,106 B1 | 10/2003 | Numata et al. | |
| 6,633,724 B1 | 10/2003 | Hasegawa et al. | |
| 6,667,939 B1 | 12/2003 | Miyamoto et al. | |
| 6,671,249 B2 | 12/2003 | Horie et al. | |
| 6,697,306 B2 | 2/2004 | Sako et al. | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 | 7/2004 | Alexander et al. | |
| 6,785,206 B1 | 8/2004 | Lee et al. | |
| 6,788,631 B1 | 9/2004 | Park et al. | |
| 6,795,389 B1 | 9/2004 | Nishiuchi et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,883,111 B2 | 4/2005 | Yoshida et al. | |
| 6,918,003 B2 | 7/2005 | Sasaki et al. | |
| 6,922,802 B2 | 7/2005 | Kim et al. | |
| 6,934,236 B2 | 8/2005 | Lee et al. | |
| 6,999,398 B2 | 2/2006 | Yamamoto et al. | |
| 7,002,882 B2 | 2/2006 | Takahashi et al. | |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,272,086 B2 | 9/2007 | Hwang et al. | |
| 7,289,404 B2* | 10/2007 | Park et al. | 369/53.17 |
| 7,296,178 B2 | 11/2007 | Yoshida et al. | |
| 7,313,066 B2 | 12/2007 | Hwang et al. | |
| 7,327,654 B2 | 2/2008 | Hwang et al. | |
| 7,337,354 B2* | 2/2008 | Yoshida et al. | 714/8 |
| 7,349,301 B2 | 3/2008 | Terada et al. | |
| 7,379,402 B2 | 5/2008 | Ko et al. | |
| 2001/0009537 A1 | 7/2001 | Park | |
| 2001/0011267 A1 | 8/2001 | Kihara et al. | |
| 2001/0026511 A1 | 10/2001 | Ueda et al. | |
| 2001/0043525 A1 | 11/2001 | Ito et al. | |
| 2001/0043800 A1 | 11/2001 | Gotoh et al. | |
| 2002/0025138 A1 | 2/2002 | Isobe et al. | |
| 2002/0055012 A1 | 5/2002 | Chou et al. | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0133485 A1 | 9/2002 | Furuhashi | |
| 2002/0136118 A1 | 9/2002 | Takahashi | |
| 2002/0136134 A1 | 9/2002 | Ito et al. | |
| 2002/0136537 A1 | 9/2002 | Takahashi | |
| 2002/0159382 A1 | 10/2002 | Ohata et al. | |
| 2002/0161774 A1 | 10/2002 | Tol et al. | |
| 2002/0176341 A1 | 11/2002 | Ko et al. | |
| 2003/0072236 A1 | 4/2003 | Hirotsune et al. | |
| 2003/0095482 A1 | 5/2003 | Hung et al. | |
| 2003/0126527 A1 | 7/2003 | Kim et al. | |
| 2003/0135800 A1 | 7/2003 | Kim et al. | |
| 2003/0137909 A1* | 7/2003 | Ito et al. | 369/47.14 |
| 2003/0137910 A1 | 7/2003 | Ueda et al. | |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 | 10/2003 | Go et al. | |
| 2004/0001408 A1 | 1/2004 | Propps et al. | |
| 2004/0004917 A1 | 1/2004 | Lee | |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0105363 A1 | 6/2004 | Ko et al. | |
| 2004/0114474 A1 | 6/2004 | Park et al. | |
| 2004/0120233 A1 | 6/2004 | Park et al. | |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0174782 A1 | 9/2004 | Lee et al. | |
| 2004/0174785 A1 | 9/2004 | Ueda et al. | |
| 2004/0179445 A1 | 9/2004 | Park et al. | |

| | | | | | | |
|---|---|---|---|---|---|---|
| 2004/0179458 | A1 | 9/2004 | Hwang et al. | JP | 02-023417 A | 1/1990 |
| 2004/0193946 | A1 | 9/2004 | Park et al. | JP | 4-172662 | 6/1992 |
| 2004/0223427 | A1 | 11/2004 | Kim et al. | JP | 05-274814 A | 10/1993 |
| 2004/0246851 | A1 | 12/2004 | Hwang et al. | JP | 06-349201 A | 12/1994 |
| 2005/0007910 | A1 | 1/2005 | Ito et al. | JP | 8-50766 A | 2/1996 |
| 2005/0008346 | A1 | 1/2005 | Noguchi et al. | JP | 08-096522 A | 4/1996 |
| 2005/0025007 | A1 | 2/2005 | Park | JP | 09-145634 A | 6/1997 |
| 2005/0047294 | A1 | 3/2005 | Park | JP | 09-231053 A | 9/1997 |
| 2005/0050402 | A1 | 3/2005 | Koda et al. | JP | 9-251721 A | 9/1997 |
| 2005/0052972 | A1 | 3/2005 | Park | JP | 10-050005 A | 2/1998 |
| 2005/0052973 | A1 | 3/2005 | Park | JP | 10-050032 A | 2/1998 |
| 2005/0055500 | A1 | 3/2005 | Park | JP | 10-187356 | 7/1998 |
| 2005/0060489 | A1 | 3/2005 | Park | JP | 10-187357 | 7/1998 |
| 2005/0068877 | A1 | 3/2005 | Yeo | JP | 10-187358 | 7/1998 |
| 2005/0083740 | A1 | 4/2005 | Kobayashi | JP | 10-187359 | 7/1998 |
| 2005/0083767 | A1 | 4/2005 | Terada et al. | JP | 10-187360 | 7/1998 |
| 2005/0083830 | A1 | 4/2005 | Martens et al. | JP | 10-187361 A1 | 7/1998 |
| 2005/0195716 | A1 | 9/2005 | Ko et al. | JP | 11-86418 A | 3/1999 |
| 2005/0207262 | A1 | 9/2005 | Terada et al. | JP | 11-086436 | 3/1999 |
| 2005/0289389 | A1 | 12/2005 | Yamagami et al. | JP | 11-110888 A | 4/1999 |
| 2006/0077827 | A1* | 4/2006 | Takahashi ............... 369/47.14 | JP | 11-203792 A | 7/1999 |
| 2006/0195719 | A1 | 8/2006 | Ueda et al. | JP | 2000-090588 A | 3/2000 |
| 2006/0203635 | A1 | 9/2006 | Ko et al. | JP | 2000-149449 A | 5/2000 |
| 2006/0203638 | A1 | 9/2006 | Ko et al. | JP | 2000-195178 A | 7/2000 |
| 2006/0203684 | A1 | 9/2006 | Ko et al. | JP | 2000-215612 | 8/2000 |
| 2006/0227694 | A1 | 10/2006 | Woerlee et al. | JP | 2000-285607 A | 10/2000 |
| 2007/0294571 | A1 | 12/2007 | Park et al. | JP | 2001-023317 A | 1/2001 |
| 2008/0046780 | A1 | 2/2008 | Shibuya et al. | JP | 2001-069440 A | 3/2001 |
| | | | | JP | 2001-110168 A | 4/2001 |

FOREIGN PATENT DOCUMENTS

| | | |
|---|---|---|
| JP | 2001-351334 A | 12/2001 |
| CN | 1140897 C | 1/1997 |
| JP | 2001-357623 A | 12/2001 |
| CN | 1227950 A | 9/1999 |
| JP | 2002-015507 A | 1/2002 |
| CN | 1273419 A | 11/2000 |
| JP | 2002-015525 A | 1/2002 |
| CN | 1675708 A | 9/2005 |
| JP | 2002-056619 A | 2/2002 |
| CN | 1685426 A | 10/2005 |
| JP | 2002-157832 A | 5/2002 |
| DE | 199 54 054 A1 | 6/2000 |
| JP | 2002-215612 A | 8/2002 |
| EP | 0314186 A2 | 5/1989 |
| JP | 2002-245723 A | 8/2002 |
| EP | 0325823 A1 | 8/1989 |
| JP | 2002-288938 A | 10/2002 |
| EP | 0 350 920 A2 | 1/1990 |
| JP | 2002-329321 A | 11/2002 |
| EP | 0350920 A2 | 1/1990 |
| JP | 2002-352522 A | 12/2002 |
| EP | 0 484 555 A1 | 5/1991 |
| JP | 2003-536194 A | 12/2003 |
| EP | 0464811 A2 | 1/1992 |
| JP | 2004-280864 A | 10/2004 |
| EP | 0472484 A2 | 2/1992 |
| JP | 2004-280865 A | 10/2004 |
| EP | 0477503 A2 | 4/1992 |
| JP | 2005-056542 A | 3/2005 |
| EP | 0556046 A1 | 8/1993 |
| JP | 2005-004912 A | 6/2005 |
| EP | 0871172 A2 | 10/1998 |
| JP | 2005-535993 A | 11/2005 |
| EP | 0908882 A2 | 4/1999 |
| JP | 2005-538490 A | 12/2005 |
| EP | 0 957 477 A2 | 11/1999 |
| JP | 2005-538491 A | 12/2005 |
| EP | 0974967 A1 | 1/2000 |
| JP | 2006-519445 A | 8/2006 |
| EP | 0989554 A1 | 3/2000 |
| JP | 2006-519455 A | 8/2006 |
| EP | 0997904 A1 | 5/2000 |
| JP | 2006-520064 A | 8/2006 |
| EP | 1026681 B1 | 8/2000 |
| JP | 2008-282532 A | 11/2008 |
| EP | 1043723 A1 | 10/2000 |
| KR | 10-2004-0023127 A | 3/2004 |
| EP | 1132914 A2 | 9/2001 |
| KR | 1020040094301 A | 11/2004 |
| EP | 1148493 | 10/2001 |
| RU | 2005 103 626 | 9/2005 |
| EP | 1148493 A2 | 10/2001 |
| RU | 2005 127 337 | 2/2006 |
| EP | 1 152 402 A1 | 11/2001 |
| TW | 371752 | 10/1999 |
| EP | 1152414 A2 | 11/2001 |
| TW | 413805 | 12/2000 |
| EP | 1239478 A1 | 9/2002 |
| TW | 448435 B2 | 8/2001 |
| EP | 1274081 A2 | 1/2003 |
| TW | 470946 B2 | 1/2002 |
| EP | 1298659 A1 | 4/2003 |
| TW | 497098 B2 | 8/2002 |
| EP | 1329888 A1 | 7/2003 |
| WO | WO-84/00628 A1 | 2/1984 |
| EP | 1347452 A2 | 9/2003 |
| WO | WO-96/30902 A1 | 10/1996 |
| EP | 1547065 A0 | 6/2005 |
| WO | WO-97/22182 A1 | 6/1997 |
| EP | 1564740 A1 | 8/2005 |
| WO | WO-00/54274 A1 | 9/2000 |
| EP | 1573723 A0 | 9/2005 |
| WO | WO-01/22416 A1 | 3/2001 |
| EP | 1612790 A1 | 1/2006 |
| WO | WO-01/93035 A2 | 12/2001 |
| EP | 1623422 A0 | 2/2006 |
| WO | WO-01/95330 A2 | 12/2001 |
| GB | 2356735 A | 5/2001 |
| WO | WO-03/007296 A1 | 1/2003 |
| JP | 63-091842 A | 4/1988 |
| WO | WO-03/025924 A1 | 3/2003 |
| JP | 1-263955 A | 10/1989 |
| WO | WO-03/079353 A1 | 9/2003 |
| JP | 01-263955 A | 10/1989 |
| WO | WO-2004/015707 A1 | 2/2004 |
| | | |
| WO | WO-2004/015708 A1 | 2/2004 |

| | | |
|---|---|---|
| WO | WO-2004/015780 A1 | 2/2004 |
| WO | WO-2004/025648 A1 | 3/2004 |
| WO | WO-2004/025649 A1 | 3/2004 |
| WO | WO-2004/029668 A2 | 4/2004 |
| WO | WO-2004/029941 A1 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/059648 A2 | 7/2004 |
| WO | WO-2004/068476 A1 | 8/2004 |
| WO | WO-2004/015180 A1 | 9/2004 |
| WO | WO 2004-077420 A1 | 9/2004 |
| WO | WO-2004/079631 A2 | 9/2004 |
| WO | WO-2004/079731 A1 | 9/2004 |
| WO | WO-2004/079740 A1 | 9/2004 |
| WO | WO-2004/081926 A1 | 9/2004 |
| WO | WO-2004/093035 A1 | 10/2004 |
| WO | WO-2004/100155 A1 | 11/2004 |
| WO | WO-2004/100156 A1 | 11/2004 |
| WO | WO-2005/004123 A1 | 1/2005 |
| WO | WO-2005/004154 A2 | 1/2005 |

OTHER PUBLICATIONS

"ECMA 238 Data interchange on 130mm optical disks of type WORM using irreversible effects—capacity 2.6 Gbytes per cartridge"; Internet Citation; pp. 54-61; Jun. 1996, XP002289010; URL: http//www.ecma-international.org.

ECMA: "120 mm DVD Rewritable Disk (DVD-RAM)," Internet Citation, pp. 43-55, XP002518235, Feb. 1, 1998.

ECMA: Standardizing Information and Communication Systems: "Standard ECMA-240: Data Interchange on 120mm Optical Disk Cartridges using Phase Change PD Format—Capacity: 650 Mbytes per Cartridge," Standard ECMA 240, pp. 41-53, XP002562014, Jun. 1, 1996.

* cited by examiner

R/A : Replacement Area

FIG. 12

Field in TDDS

| | Contents | Number of Bytes |
|---|---|---|
| Sector0 | ⋮ | ⋮ |
| | TDMA full flag | 1 |
| | TDMA1 size | 1 |
| | TDMA2 size | 1 |
| | TDMA3 size | 1 |
| | TDMA4 size | 1 |
| | ⋮ | ⋮ |

FIG. 13

| b7 | b6 | b5 | b4 | b3 | b2 | b1 | b0 |
|---|---|---|---|---|---|---|---|
| | | | | TDMA4 full | TDMA3 full | TDMA2 full | TDMA1 full | ized
WRITE-ONCE RECORDING MEDIUM AND DEFECTIVE AREA MANAGEMENT METHOD AND APPARATUS FOR WRITE-ONCE RECORDING MEDIUM This application is a Continuation of U.S. patent application Ser. No. 10/670,374 filed on Sep. 26, 2003 now U.S. Pat. No. 7,289,404 (now allowed) and for which priority is claimed under 35 U.S.C. §120, and also claims priority benefits of Korean Patent Application No. 2003-015634, filed on Mar. 13, 2003. The entire contents of each of these applications are hereby incorporated by reference.

BACKGROUND OF THE INVENTION

1. Field of the Invention

The present invention relates to a write-once optical recording medium, a method and apparatus for managing defect management information thereof, and more particularly, to a method and device for allocating temporary defect management areas, a method for allocating a spare area for defect management and an optical recording medium on which the temporary defect management areas and the spare area are allocated on a write-once type of the optical recording medium such as a Blu-ray disc.

2. Discussion of the Background Art

Optical discs, which are a kind of optical recording media, can record a large amount of data, and are now being widely used. Currently, a kind of innovative high-density digital versatile disc (HD-DVD) such as blue ray disc (Blu-ray Disc) is under development. This kind of medium can record and store video data of high quality and audio data of high fidelity for a long time.

The Blu-ray disc is a next generation optical recording solution that can store a larger amount of data than a conventional DVD.

The Blu-ray disc generally employs a blue-violet laser having a wavelength of 405 nm. This wavelength is shorter than a red laser used on a conventional DVD. The wavelength of the red laser is 650 nm. The Blu-ray disc has a thickness of 1.2 mm and a diameter of 12 cm, and includes a light transmission layer having a thickness of about 0.1 mm. Therefore, the Blu-ray disc can store a larger amount of data than a conventional DVD.

An optical disc device for writing and reading data on the Blu-ray disc is shown in FIG. 1. It includes an optical pick-up 11 for writing and reading a signal to and from an optical disc 10, a video disc recorder (VDR) system 12 for processing the signal read out from the optical pick-up 11 into a replay signal, or for modulating and processing an externally inputted data stream into a record signal suitable for recording, and an encoder 13 for encoding an externally inputted analog signal and outputting the encoded analog signal to the VDR system 12.

A Blu-ray disc can be of a rewritable type, which is referred to herein as a Blu-ray Disc Rewritable (BD-RE). A BD-RE has a rewritable capability, which enables video and audio data to be written, erased, and rewritten thereon repeatedly.

The BD-RE, as shown in FIG. 2 is divided into a lead-in area (LIA), a data area and a lead-out area (LOA), and the front and the rear of the data area are allocated to have an inner spare area (ISA) and an outer spare area (OSA).

With the BD-RE configured in the manner described above, the VDR system 12 of the optical disc device shown in FIG. 1 encodes and modulates externally inputted data into a signal suitable for recording, and records by cluster unit corresponding to error correction block unit. If a defective area occurs in the data area while recording data on the BD-RE, the data of one cluster unit recorded on the defective area is also recorded on the spare area (for example, the inner spare area on the BD-RE) according to a linear replacement operation. A series of linear replacement operations can be performed.

Accordingly, the VDR system 12 of the optical disc device records the data of the cluster unit recorded on the defective area onto the spare area, even if the defective area occurs in the data area of the rewritable Blu-ray disc. When a playback operation is performed for the rewritable Blu-ray disc, the data recorded onto the spare area are read out and replayed so that a data recording error can be prevented.

Various standards related to the Blu-ray disc are under development.

In this respect, a second type of Blu-ray disc, on which data is not repeatedly rewritten (non-rewritable), but is written only once, is herein referred to as a Blu-ray Disc Write-Once (BD-WO). The Write-once Blu-Ray disc is useful when it is not desirable to repeatedly rewrite data. In a BD-WO, management of defective areas is needed.

But since data can be recorded on the BD-RE repeatedly (due to the characteristics of the BD-RE), the size of the defect management area (DMA) for the rewritable Blu-ray disc is relatively small (see DMA 1~DMA 4 in FIG. 2). In contrast, since data is recorded on the write-once Blu-ray disc only one time, the area required in the BD-WO to manage the defective area needs to be larger than the area required for a write-once Blu-ray disc. Accordingly, a sufficiently sized defect management area should be allocated for the BD-WO.

A Blu-ray disc such as a BD-WO having both a sufficiently sized defect management area can store an even greater amount of data than the conventional DVD when a cross-section two-layers recording technology is applied for making two recording layers on one side of the disc with 0.85 NA (Lens Numerical Apertures). An increase in storing capacity is achieved by closely irradiating rays being passed through a lens to the optical disc.

A Blu-ray disc has generally a high numerical aperture lens, increased density, and a 0.32 μm track pitch. An optical disc being manufactured by using the Blu-ray disc technology can transmit data at a much faster speed than a DVD ROM and a CD ROM. When formatting video and audio data, a formatting method being presently used for DVD such as MPEG2 (video), AC3, MPEG1 and layer 2 (audio) should be used so as to maintain compatibility with the conventional methods. A feature of a HD-DVD type drive (such as BD-WO) effectively protecting data, should be such that its data can be stored on and reproduced from most of conventional DVD discs being presently used.

SUMMARY OF THE INVENTION

Accordingly, the present invention is directed to a write-once optical recording medium such as a BD-WO, a defect management information management method thereof, and an apparatus for implementing the method, that substantially obviate one or more problems due to limitations and disadvantages of the background art.

An object of the present invention is to provide a method for managing defect management information on a write-once optical recording medium and a recording medium including a recording area of defect management information.

Another object of the present invention is to provide a defect management method for a write-once Blu-ray disc and a recording medium including a recording area of defect management information.

Additional advantages, objects, and features of the invention will be set forth in part in the description which follows, and in part will become apparent to those having ordinary skill in the art upon examination of the following, or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the defect management method for the write-once recording medium includes a method of managing defects on a write-once optical recording medium having at least one recording layer, the method comprising the steps of allocating at least one replacement area and a plurality of temporary defect management areas to the optical recording medium, wherein the temporary defect management areas are separately provided; and recording defect management information on at least one of the plurality of temporary defect management areas.

In another aspect of the present invention, an apparatus of managing defects on a write-once optical recording medium having at least one recording layer, the apparatus comprising means for allocating at least one replacement area and a plurality of temporary defect management areas to the optical recording medium, wherein the temporary defect management areas are separately provided; and means for recording defect management information on at least one of the plurality of temporary defect management areas.

In another aspect of the present invention, a write-once optical recording medium comprises at least one replacement area; and a plurality of temporary defect management areas allocated to the optical recording medium, wherein the temporary defect management areas are separately provided.

According to an embodiment, the present invention provides a method of managing defects on an optical recording medium, comprising allocating at least one spare area to the recording medium, and at least one temporary defect management area to the spare area when a plurality of temporary defect management areas are to be separately provided; recording defect management information on a first temporary defect management area; and recording defect management information on a second temporary defect management area after the first temporary defect management area is full, the second temporary defect management area being allocated to the spare area.

According to an embodiment, the present invention provides an apparatus of managing defects on an optical recording medium, the apparatus comprising a recording/reproducing device for allocating at least one spare area to the recording medium, and at least one temporary defect management area to the spare area when a plurality of temporary defect management areas are to be separately provided, and recording defect management information on a first temporary defect management area and recording defect management information on a second temporary defect management area after the first temporary defect management area is full, the second temporary defect management area being allocated to the spare area.

According to an embodiment, the present invention provides a recording medium, comprising at least one spare area for managing defects on the recording medium; and a plurality of temporary defect management areas for storing defect management information, at least one temporary defect management area allocated to the spare area when the plurality of temporary defect management areas are to be separately provided, wherein the plurality of temporary defect management areas include a first temporary defect management area and a second temporary defect management area according to a use order, the first temporary defect management area is firstly used and the second temporary defect management area is used after the first temporary defect management area is full, the second temporary defect management area being allocated to the spare area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention, and together with the description serve to explain the principle of the invention. In the drawings;

FIG. 12 illustrates an example of a configuration of TDDS and information contents according to an embodiment of the present invention; and FIG. 13 is a diagram showing an example of a full flag configuration of a temporary defect management area of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 3:
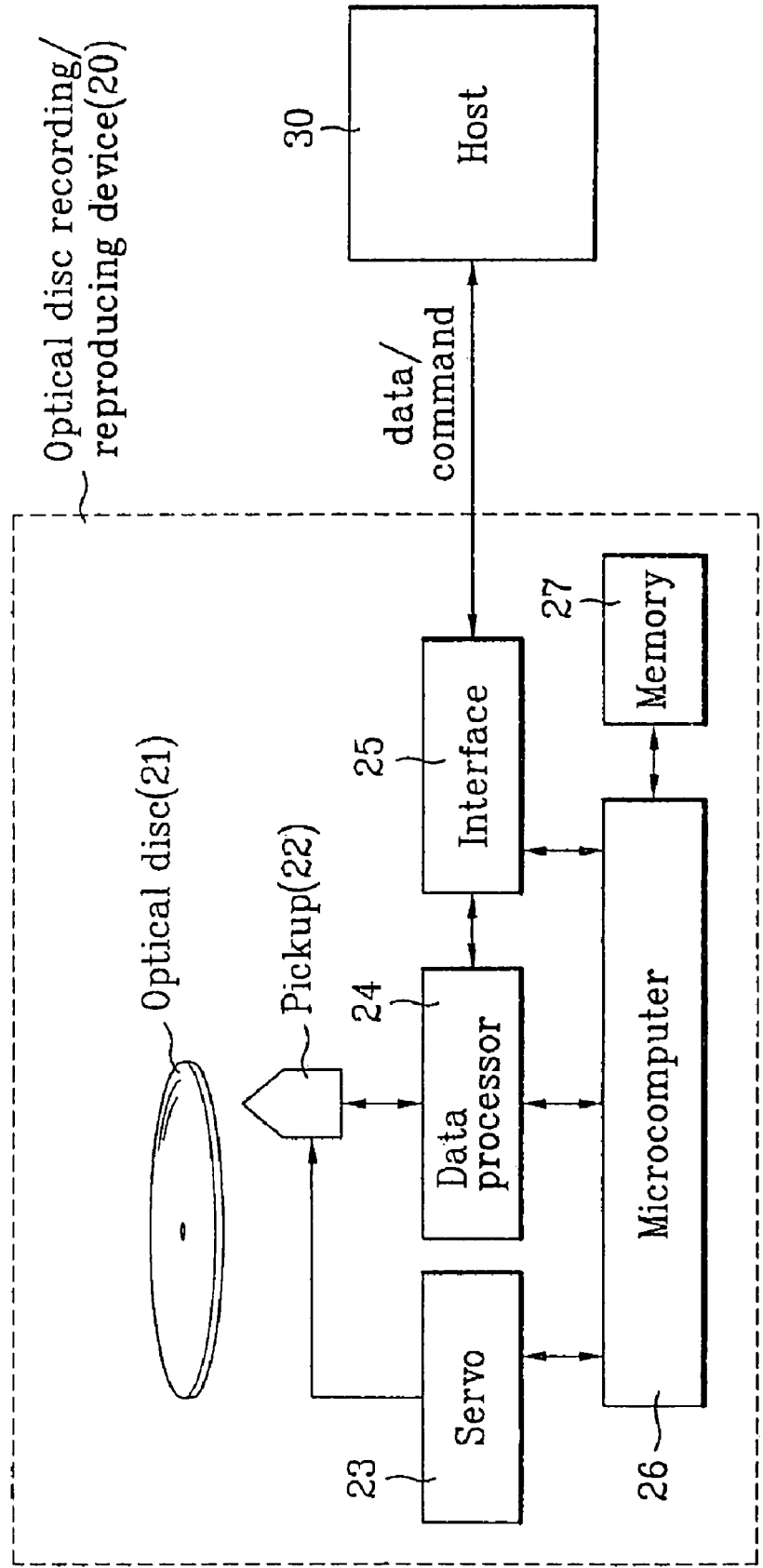
FIG. 3 illustrates a schematic configuration of an optical disc device for a BD-WO of the present invention.

Referring to FIG. 3, an optical disc recording/reproducing device 20 for a BD-WO according to the present invention includes an optical pickup 22 for writing/reading data to/from an optical recording medium 21 such as a BD-WO, a pickup servo unit 23 for controlling the optical pickup 22 to maintain a distance between an objective lens in the optical pickup 22 and the optical recording medium 21 and for tracking a pertinent track, a data processor 24 for processing and providing input data to the optical pickup 22, an interface 25 for exchanging data with an external host 30, a memory 27 for storing information regarding defect management, and a microcomputer 26 for controlling the above units. All of the components of the device 20 are operatively coupled. The host 30 is connected to the interface 25 of the device 20 for recording/reproducing data to/from the optical recording medium 21 for exchange of commands and data.

Figure 1:
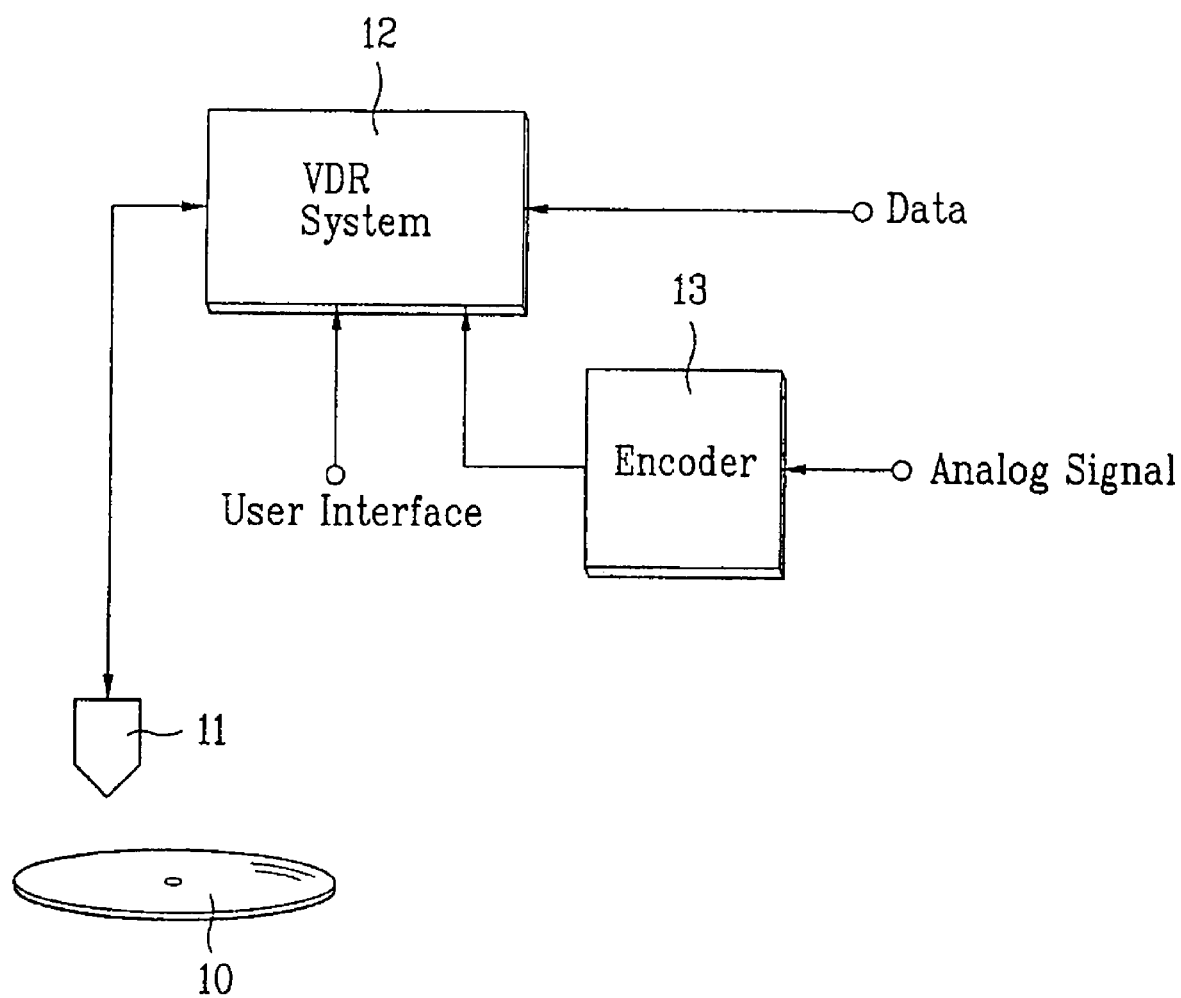
FIG. 1 is a schematic configuration of a general optical disc device.
Figure 2:
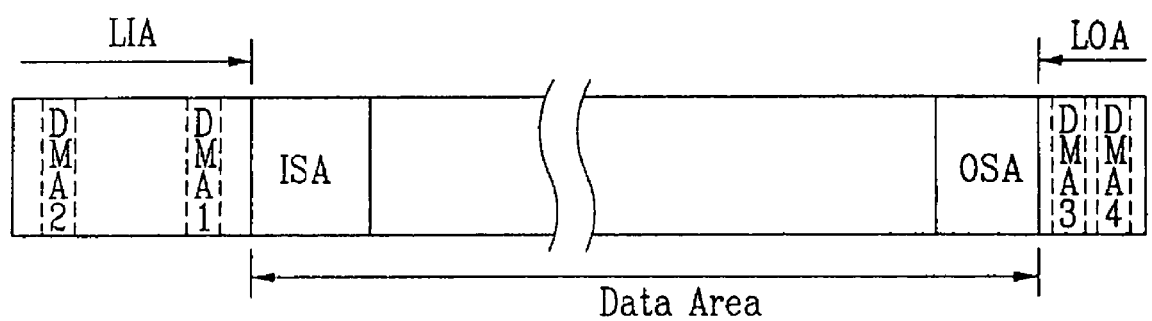
FIG. 2 illustrates a configuration of a recording area of a BD-RE.

When an optical recording medium such as a BD-WO is loaded, the device 20 loads information regarding defect management such as DMA (defect management area) information, TDMA (temporary defect management area) information and so on, into the memory 27 or other suitable storage. During operation, the memory 27 is updated periodically in accordance with a defect management operation. The present methods can be implemented using the device shown in FIG. 1 and FIG. 3, or other suitable devices or systems.

Figure 4:
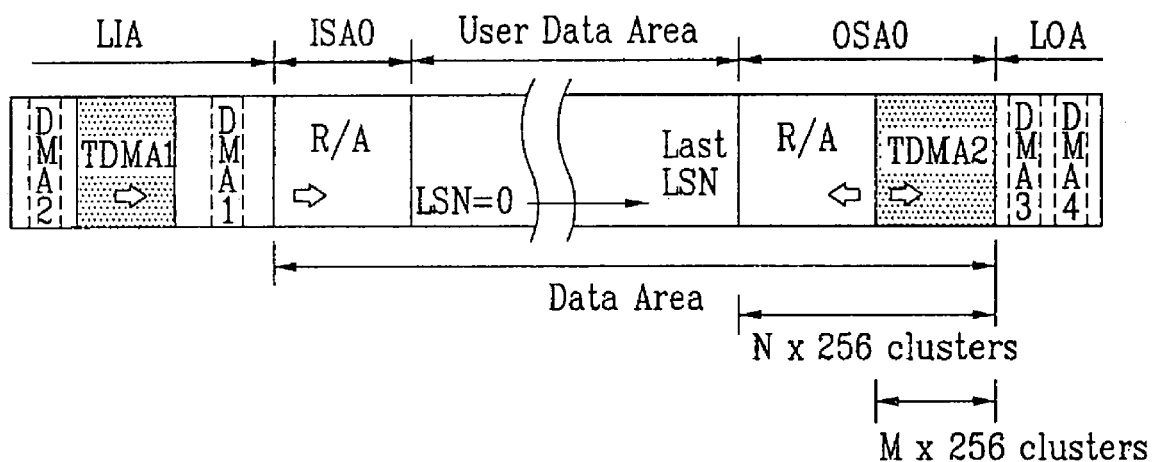
FIG. 4 illustrates one example of a recording area of a write once optical recording medium according to an embodiment of the present invention.

FIG. 4 illustrates an example of recording area configuration of a BD-WO according to an embodiment of the present invention. The BD-WO shown in FIG. 4 has a structure of a single layer disc (i.e., it has a single recording layer). Also, the BD-WO shown in FIG. 4 includes a lead-in area (LIA), a data area and a lead-out area (LOA). A user data area is located within the data area. The lead-in and lead-out areas include final or permanent defect management areas (DMA 1~DMA 4). The arrows shown in each respective area indicate examples of a data recording direction.

A temporary defect management area (TDMA 1 or TDMA 2) according to the present invention is provided in the lead-in area and the data area of the BD-WO. Here, the TDMAs (temporary defect management areas) can be distinguished from the final defect management areas (DMA 1, DMA 2, DMA 3, DMA 4). Particularly, the temporary defect management area (TDMA) is an area of the BD-WO that is used to "temporarily" record and manage defect management information until the BD-WO is finalized. Afterward, the defect management information is recorded onto at least one of multiple defect management areas, for example DMA 1~DMA 4, on the recording layer shown in FIG. 4. The BD-WO is considered to be finalized, e.g., when recording data onto a user data area of the BD-WO has been completed.

The data area of the BD-WO shown in FIG. 4 includes a user data area, an inner spare area (ISA0) and an outer spare area (OSA0.) The second TDMA 2 is provided in the OSA0. The OSA0 may also include a replacement area R/A fore replacement-recording the data corresponding to a defective are in the user data area. The entire ISA0 may be used as a R/A. That is, in the embodiment shown in FIG. 4, a plurality of temporary defect management areas (TDMA 1, TDMA 2) are provided separately in specified areas on the BD-WO. For example, the TDMA 1 is provided in the lead-in area, and the TDMA 2 is provided in the outer spare area. An example of such specified areas is an inner circumferential area and an outer circumferential area of the BD-WO. Particularly, FIG. 4 schematically shows that the inner circumferential area is provided in the inner circumferential area and the outer circumferential area is provided at an end portion of the data area.

The size of the TDMA 2 provided in the outer circumferential area of the BD-WO may be fixed. On the other hand, the size of TDMA 2 can be changed according to the size of the spare area (for example, OSA0). In a more particular example, when the size of the OSA0 is N×256 clusters, the size of the TDMA 2 is M×256 clusters. Here, M is an integer determined from N/4 (M=N/4.) For example, when N=64, the size of the spare area (OSA0) is 16384 clusters and the size of the TDMA 2 is 4096 clusters because M=N/4.

There are reasons why the size of the TDMA 2 provided in the outer circumferential area of the BD-WO can be changed according to the size of the spare area (OSA0). One reason is that when a replacement area for data to be written is provided in the spare area, the size of the replacement area, the size of the temporary defect management area and the size of the spare area are interdependent. If the size of one of these is reduced, then the size of the other may be increased (and vice versa). Compared to the size of TDMA 2, in this particular embodiment, the size of the temporary defect management area (TDMA 1) provided in the inner circumferential area (the lead-in area) maintains a fixed value. The temporary defect management area (TDMA 1) provided in the lead-in area in this embodiment of the present invention may be used according to the use of the TDMA 2. For example, when the TDMA 2 provided in the spare area (OSA0) is not managing the defects, the spare area may be allocated to have a size of '0.' Thus, the size of the TDMA 2 becomes '0'. Such a case may exist when all of the data area is used for recording user data. Nevertheless, the TDMA 1 of the lead-in area may still be available, and management and description of specific information by using DDS (disc definition structure) may also be available. However, DDS may not be available for management of a defect list. A more particular discussion will be provided below, referring to FIG. 10 and FIG. 11.

When a defective area is detected in the user data area, data to be recorded in the defective area is recorded to a replacement area R/A and the defect management information associated with this defective area is recorded into one or more of the TDMA 1 and TDMA 2.

Figure 5:
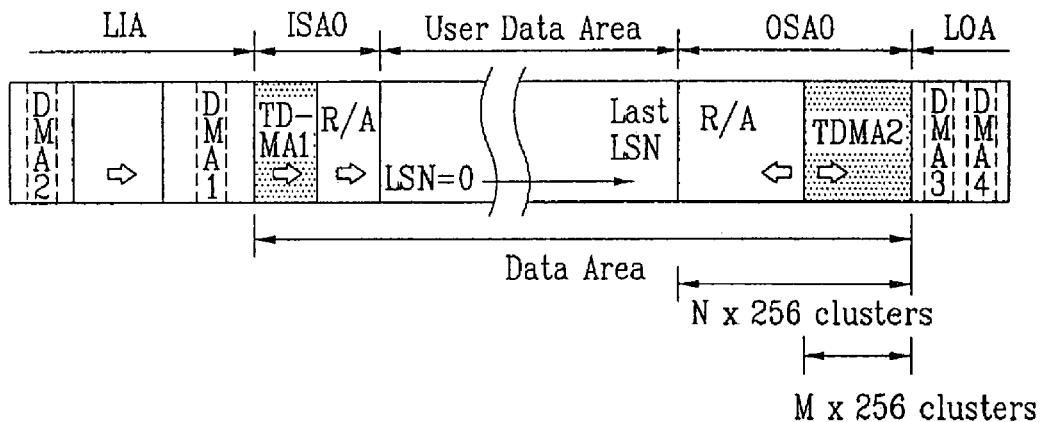
FIG. 5 illustrates another example recording area of a write-once optical recording medium according to another embodiment of the present invention.

FIG. 5 shows an embodiment of the present invention, which illustrates another configuration of a BD-WO. The BD-WO shown in FIG. 5 is a single layer disc having a configuration which includes a lead-in area, a data area and a lead-out area. The arrows in each area are used to indicate a direction of recording data. Each of the inner and outer spare areas ISA0 and OSA0 includes a replacement area R/A for replacement-recording data corresponding to a defective area (if found) in the user data area.

In the embodiment shown in FIG. 5, the temporary defect management area (TDMA 1) is provided at a beginning portion of the data area, e.g., the inner spare area (ISA0). The second TDMA 2 is provided in the outer spare area (OSA0). As a result, a plurality of temporary defect management areas (TDMA 1 and TDMA 2) are separately provided in pre-specified areas (ISA0, OSA0) of the BD-WO in this embodiment of the present invention. The first TDMA (TDMA 1) is provided in the inner spare area and the second TDMA (TDMA 2) is provided in the outer spare area. Broadly, each of the plurality of temporary defect management areas is separately provided in a specified area of BD-WO. In this example, the specified area is the inner circumferential area and the outer circumferential area. More precisely, in the embodiment shown in FIG. 5, the inner circumferential area is provided at the starting portion of the data area and the outer circumferential area is provided at the end portion of the data area.

In this embodiment, the size of the temporary defect management area (e.g., TDMA 2) provided in the outer area of the BD-WO can be fixed, or variable according to the size of the spare area (OSA0). Similarly, the size of the TDMA 1 may be fixed or variable as need. But preferably, the TDMA 1 in the lead-in area has a fixed size whereas the TDMA 2 in the OSA0 has a variable size.

According to this example, when a defective area is detected, the data to be recorded into the defective area is recorded into a replacement area R/A and the defect management information associated with the defective area is recorded in one or more of the TDMA 1 and TDMA 2. The replacement area for recording the defective information is provided in one of the spare areas.

Figure 6:
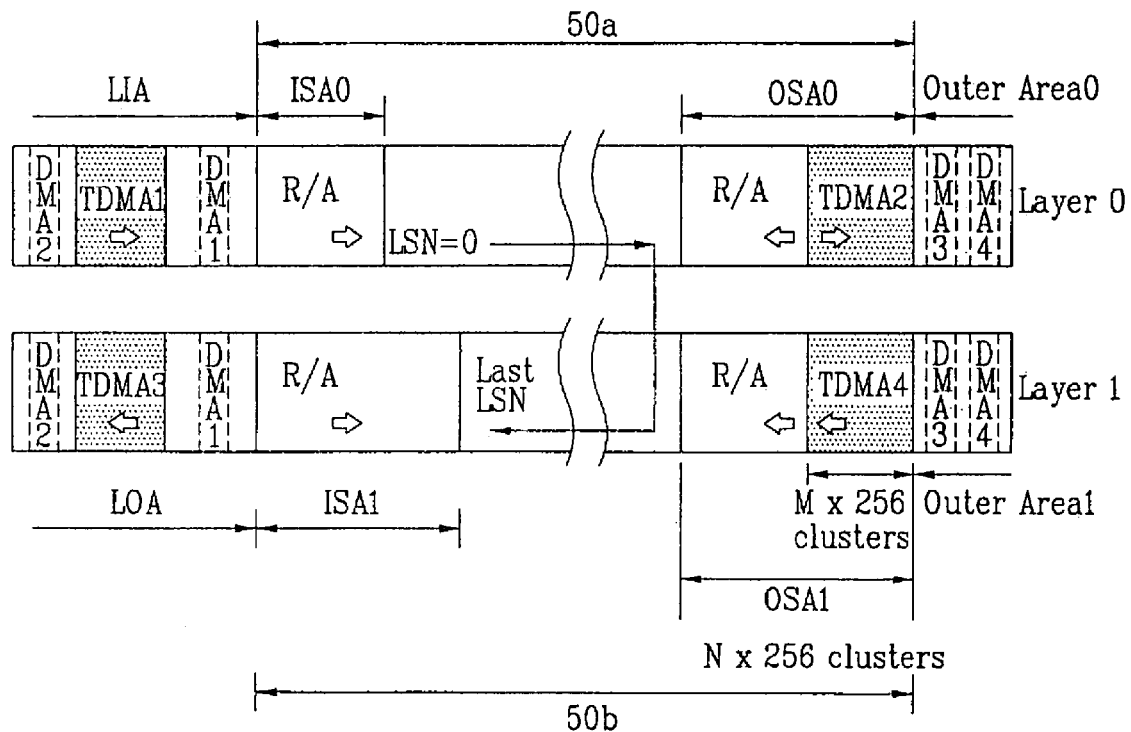
FIG. 6 illustrates another example of a recording area of a write-once optical recording medium according to another embodiment of the present invention.

FIG. 6 illustrates another recording area configuration of the BD-WO according to the present invention. The BD-WO shown in FIG. 6 has two recording layers (Layers 0 and 1). The firsts layer (Layer 0) includes a lead-in area, a data area 50a, and an outer area Outer Area 0. The second layer (Layer 1) includes a lead-out area, a data area 50b, and an outer area Outer Area 1. A plurality of DMAs (DMA 1~DMA 4) are provided on each layer. Each of the data areas 50a and 50b includes at least one spare area. Arrows in the respective areas indicate examples of a recording direction.

In this embodiment, a temporary defect management area (TDMA 1 or TDMA 3) is provided on each layer in the lead-in area or lead-out area. The inner spare areas (ISA0, ISA1) and the outer spare areas (OSA0, OSA1) area provided in the respective data areas 50a and 50b on each layer. A temporary defect management area (TDMA 2 or TDMA 4) is provided on each layer of the outer spare area (OSA0 or OSA1) respectively. In this example, the entire ISA0 and ISA1 may be used as a replacement area R/A. Each of the OSA0 and OSA1 may include a replacement area R/A.

This embodiment can be broadly described as having a plurality of separate temporary defect management areas (TDMA 1, TDMA 3, TDMA 2, TDMA 4), each provided in a specified area of the BD-WO. The first pair (TDMA 1, TDMA 3) is provided in the lead-in and lead-out areas and the second pair (TDMA 2, TDMA 4) is provided in the outer spare areas OSA0 and OSA1. This embodiment can also be described as a plurality of the temporary defect management areas, separately provided in their specified areas (on each layer) in the inner circumferential area and the outer circumferential area of the dual layer BD-WO. Particularly, the inner circumferential area is provided in the lead-in and lead-out areas and the outer circumferential area is provided at the end portion of the respective data area.

The sizes of the TDMA 2 and TDMA 4 provided in the outer circumferential area of the BD-WO can be fixed or varied according to the size of the associated spare area. For example, when the sizes of one of the outer circumferential areas (OSA0, OSA1) is N×256 clusters, the size of either one of the TDMA 2 and TDMA 4 is variable to M×256 clusters. Here, M is an integer number determined from N/4 (M=N/4). For example, when N=32, the sizes of each (or any one of) the outer spare areas (OSA0, OSA1) is 8192 clusters and the sizes of each (or any one of) the TDMA 2 and TDMA 4 becomes 2048 clusters (TDMA 2=TDMA 4=8192 clusters) because M=N/4=8. Similarly, the size of the TDMAs 1 and 3 may be fixed or variable. But preferably, each of the TDMAs 1 and 3 in the lead-in and lead-out area has a fixed size, whereas each of the TDMAs 2 and 4 in the outer spare areas OSA0 and OSA1 has a variable size.

There is a reason why the size of the temporary defect management areas (TDMA 2, TDMA 4) provided in the outer circumferential area of the BD-WO can be changed according to the size of the spare areas (OSA0, OSA1). One reason is that the size of the replacement area, the size of the temporary defect management area and the size of the spare area are interdependent when a replacement area is provided in the spare area as an alternative to the temporary defect management area. In comparison, the sizes of the temporary defect management areas (TDMA 1, TDMA 3) provided in the inner circumferential area (the lead-in and lead-out areas) are preferably fixed.

In the example of FIG. 6, the temporary defect management areas (TDMA 1, TDMA 3) provided in the lead-in and lead-out areas may be used according to the use of temporary defect management areas TDMA 2, TDMA 4). For example, when the temporary defect management areas (TDMA 2, TDMA 4) provided in the outer spare areas (OSA0, OSA1) are not managing the defective areas, the spare areas (ISA0, OSA0) may be allocated to a size of '0.' Thus, the size of the TDMA 2 becomes '0' when all of the data area is used for recording user data. However, the temporary defect management areas (TDMA 1, TDMA 3) of the lead-in area are still available, and management and description of specific information can still take place. In this case the DFL (Defect List) may not be managed. This will be described in more detail below referring to FIG. 10 and FIG. 11.

When a defective area is discovered, data to be recorded into a defective area of a user data area is recorded into a replacement area R/A and the defect management information associated with the defective area is recorded into one or more of the temporary defect management areas (TDMA 1, TDMA 2, TDMA 3, TDMA 4) provided in the pre-specified areas of the BD-WO. In the example of FIG. 6, the replacement area is provided in a portion of one of the spare areas.

Figure 7:
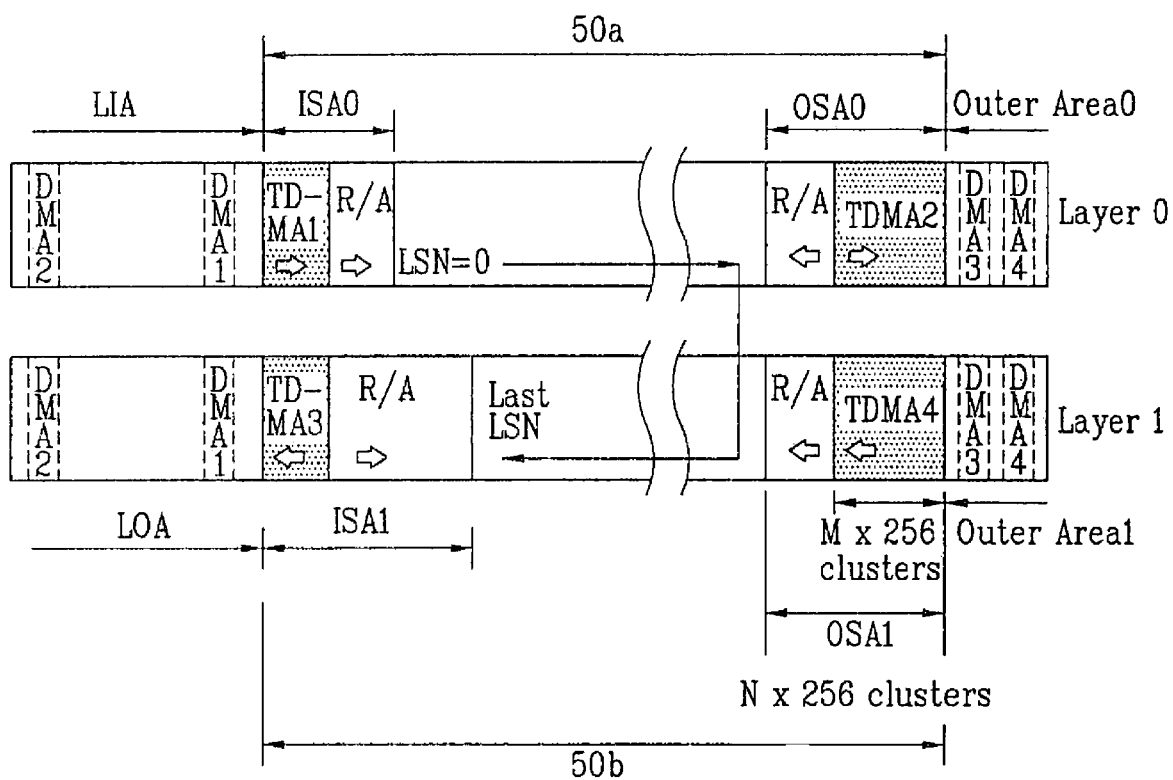
FIG. 7 illustrates another example of a recording area of a write-once optical recording medium according to an embodiment of the present invention.

FIG. 7 shows another example of a recording area configuration of a BD-WO according to an embodiment of the present invention. This example is identical to the example of FIG. 6, except that the TDMAs are now provided in inner and outer spare areas of each layer (Layers 0 and 1). That is, the example of FIG. 7 is a dual layer disc version of the single layer disc configuration shown in FIG. 5.

Particularly, the BD-WO in FIG. 7 shows the configuration of a dual layer BD-WO, including a lead-in area, a lead-out area, data areas 50a and 50b and Outer Areas (Outer Area 0, Outer Area 1). The arrows in the respective areas indicate examples of a recording direction.

The first temporary defect management areas (TDMA 1, TDMA 3) according to this embodiment are provided on each recording layer at a beginning portion of the respective data area 50a, 50b. That is, they are provided in the inner spare areas ISA0 and ISA1 of the data areas. The second temporary defect management areas (TDMA 2, TDMA 4) are provided on each recording layer at an ending portion of the respective data area. That is, they are provided in the outer spare areas (OSA0, OSA1) of the data areas 50a and 50b.

Descriptively, the embodiment of the present invention shown in FIG. 7 includes a plurality of the temporary defect management areas (TDMA 1, TDMA 3, TDMA 2, TDMA 4) where each of TDMAs is provided at a beginning portion of a data area (the inner spare area) and at an end portion of the data area (the outer spare area).

The size of the temporary defect management areas (TDMA 2, TDMA 4) provided in the outer circumferential area of the BD-WO can be fixed or variable according to the size of the outer spare area (OSA0). According to this embodiment, if a defective area is detected when recording data on the BD-WO, data to be recorded into the defective area is alternatively recorded into a replacement area R/A and the defect management information associated with the defective area is recorded into one or more of the temporary defect management areas (TDMA 1, TDMA 2, TDMA 3, TDMA 4) provided in their respective pre-specified areas of the BD-WO. The size of the TDMAs 1 and 3 is fixed and the size of the TDMAs 2 and 4 is variable.

In another embodiment, a method of recording defect management information includes steps of providing a last defect management area and a temporary defect management area, alternatively recording defect management into a spare area instead of a temporary defect management area, recording defect management information into the plurality of the temporary defect management area separately provided in respective pre-specified areas of the BD-WO and recording the defect management information into the last defect management area after the temporary defect management are is completely used.

Using the configuration of a BD-WO in FIG. 4 as an example, a plurality of the temporary defect management areas (TDMA 1, TDMA 2) are provided and the defect management areas (DMA 1, DMA 2, DMA 3, DMA 4) provided in the lead-out area are last defect management areas. If a defective area is detected when recording data, data to be recorded into the data area is alternatively recorded into a replacement area provided in the spare area and corresponding defect management information is recorded into a temporary defect management area. After the temporary defect management area (TDMAs) is completely used up such that no more TDMAs are available to record the defect management information, then the "last" or latest defect management information is recorded into the last defect management area (DMA 1 DMA 4).

Figure 8:
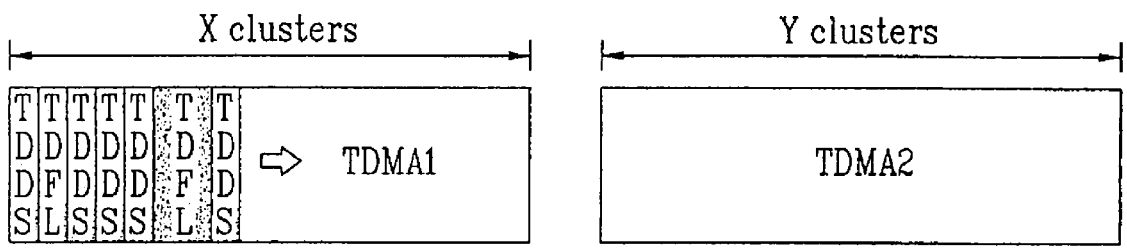
FIG. 8 illustrates an example of a temporary defect management area usage method of the present invention.

FIG. 8 illustrates an example of a method of using the plurality of temporary management areas (TDMA 1~TDMA 4) in the single layer or dual layer BD-WO according to an embodiment of the present invention. In this method, TDMA 1 stores therein both TDDS (temporary disc definition structure) and TDFL (temporary defect list). However, although not shown in the illustration, the TDMA 2 also includes both TDDS and TDFL. The embodiment shown in FIG. 8 illustrates that the particular defect management information (TDDS and TDFL) is recorded in the TDMA 1 before it is recorded in the TDMA 2. While only the TDMA 1 and TDMA 2 are shown, this method applies to all of the TDMAs (TDMA 1~TDMA 4).

A discussion of TDDS and TDFL is now provided. In the present invention, TDDS refers to temporary disc definition structure and is distinguished from DDS (disc definition structure), in that TDDS is temporary. Similarly TDFL refers to a temporary defect list, and is distinguished from a DFL (defect list) in that TDFL is temporary. Herein, both the TDFL and TDDS are included in a plurality of TDMAs.

The temporary defect list (TDFL) contains (in part) a list of clusters that are determined to be defective during the use of the media. In relation thereto, TDDS specifies the format and status of the disc with relation to defect management, and in general, provides overall management information. A format of the disc may include information regarding the specific layout of areas on the disc for managing defective areas, and status of a disc may include various flags (explained below). The TDFL includes the addresses of the defective areas and the replacement areas. TDDS and TDFL recorded in the temporary defect management areas (for example, TDMA 1 and TDMA 2), become permanent information (DDS and DFL) written in the permanent defect management areas (for example, DMA 1-4). When a disc is finalized or defects can no longer be managed, the latest TDDS and TDFL stored in the TDMA(s) are transferred to and recorded in at least one of the DMAs as DDS information and DFL information, respectively. During the recording of data in the user data area(s), the TDDS and TDFL are updated periodically or at the same time and the updates are recorded in the TDMA(s). The particular operation of these will become more apparent as the discussion thereof progresses.

In the embodiment shown in FIG. 8, the TDMA 1 is used first (before the TDMA 2 is used) to record therein defect management information such as TDDS and TDFL information. When the TDMA 1 is full, the TDMA 2 is used to record therein the defect management information. However, in another variation, the TDMA 2 is used first (before the TDMA 1). In this case, when the TDMA 2 is full, the TDMA 1 is used to record the defect management information. In such an instance, information providing notification of which area among the plurality of TDMAs is full is indicated by a "full flag" of TDMA. The "full flag" indication is necessary because preferred embodiments disclosed herein require information indicating which area among a plurality of TDMAs is full. In one example, this TDMA 1 full flag may be included in the TDDS.

Accordingly, in the embodiment of FIG. 8, the TDMA 1 and TDMA 2 or the TDMA 2 and TDMA 1 are sequentially used to store therein defect management information. In further embodiments, the TDMA 1 and TDMA 2 are located in the lead-in area and lead-out area of the BD-WO. The usage of a particular TDMA depends on a variety of factors, examples of which will be provided in a discussion of methods of using the plurality of TDMAs.

It should be noted that the method of FIG. 8 and any other methods discussed herein (FIGS. 9-13) are applicable to the disc structures of FIGS. 4, 5, 6 and 7 and any other variations thereof discussed herein. It should also be noted that the present invention encompasses embodiments that include one or a plurality of TDMAs on each recording layer of the BD-WO.

Figure 9:
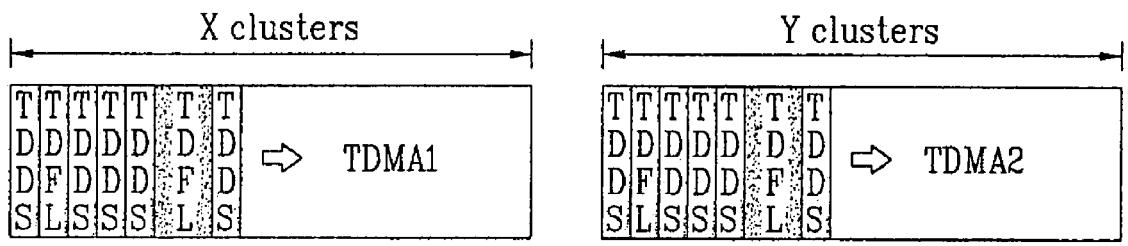
FIG. 9 illustrates another example of a temporary defect management area usage method of the present invention.

In FIG. 8 and subsequent FIG. 9, only TDMAs 1 and 2 are shown. These are merely one example of representation and can represent any other TDMAs allocated on a BD-WO (e.g., TDMAs 1 and 3; TDMAs 2 and 4; TDMAs 3 and 6, etc.)

FIG. 9 illustrates another example of a method of using the plurality of temporary management areas (TDMA 1~TDMA 4) in the single layer or dual layer BD-WO according to an embodiment of the present invention. However, the example of FIG. 9, as well as the example of FIG. 8, will be better understood after a discussion of the example of a TDMA full flag as shown in FIG. 12, and the related structure shown in FIG. 13.

FIG. 12 illustrates an example of a writing configuration of the defect management information according to the present invention. Shown in the example is a TDMA full flag indicating whether or not a TDMA is full. This full flag is recorded in the TDDS. The TDDS, as mentioned above, includes overall management information. In order to manage a defective area in the present invention, a TDMA full flag and indicators such as 'TDMA 1 size', 'TDMA 2 size', etc. are used. On the other hand, the full flag and the size indicators may not be required in every situation. Particularly, a full flag provides information on whether a specific area is full and may be a 1-bit indication corresponding to the specific area. In the embodiment shown, if the specific area is a TDMA of the structure, and the bit value of the corresponding full flag is "1", then the corresponding area (TDMA 1, for example) is regarded as being full or in a 'full' state. Accordingly, the particular TDMA can no longer be used because the TDMA is full.

FIG. 13 shows an example of an 8-bit TDMA full flag indicating whether or not one or more TDMAs (TDMA 1~TDMA 4) are full. The structure shown in FIG. 13 is included in the field of TDDS shown in FIG. 12. The size of the TDDS is fixed, e.g., 1 cluster, and the size of the TDFL is variable in recording the TDDS and the TDFL as shown in FIG. 8. The size of the TDFL of a dual layer BD-WO as shown in FIG. 6 and FIG. 7 can be changed from 1 cluster to 8 clusters. The size is determined considering the capacity of an entire disc and the size of the spare area.

According to the method of using the plurality of TDMAs, if a defective area is created or discovered when data are recorded on a BD-WO, the data recorded or to be recorded on the defective area of the BD-WO are recorded on a predetermined replacement area (e.g., spare area) in the BD-WO. More discussion regarding FIG. 13 will be provided later.

A discussion of FIG. 9 will now be provided. As mentioned, FIG. 9 illustrates another example of a temporary defect management area usage method of the present invention. In the method of using the temporary or defect management area shown in FIG. 9, the TDMA 1 and TDMA 2 are used randomly without determining any usage order. The TDMA full flags discussed in reference to FIGS. 12 and 13 are equally applied herein.

If the TDMA full flag indicates that a particular TDMA is full for the cases shown in FIGS. 8 and 9, a subsequent or another TDMA is used to store therein the defect management information. In a random case such as the case shown in FIG. 9, no usage order is specified. But, if all the TDMAs are full, defects on the BD-WO can no longer be managed. When defects can no longer be managed, final or latest information of TDDS and TDFL is transferred from the TDMA and recorded on at least one of the DMAs (DMA 1~DMA 4) to reflect the current disc status. More discussion on recordation of final information on a DMA will be provided later.

According to the embodiment of FIG. 9, the data of a defective area are recorded on a predetermined replacement area. The defect management information pertaining to this defective area and the replacement area is randomly recorded on the desired TDMA. For example, the TDMA nearest to the area where the defective area is located on the BD-WO is available for recording such defect management information. Therefore, as shown in FIG. 9, the TDMAs may be used variably, or as needed.

In another method of using a temporary defect management area in the present invention, a plurality of temporary defect management areas are used variably depending upon a variety of conditions.

As example, consider that an area(s) for managing defects includes TDMA 1 and TDMA 2 according to the embodiments illustrated in FIGS. 5-7. Defect management information may be recorded only on a TDMA 2 when using the BD-WO. The latest defect management information is then recorded on a TDMA 1 later when ejecting the BD-WO. In other words, the choices of an area in which to record defect management information is determined between the area to record defect management information when using the disc and the area to record defect management information when ejecting the disc.

According to another embodiment of a method of using the temporary defect management area, when recording data on the BD-WO, the data recorded (or to be recorded) on the defective area are recorded on the predetermined replacement area if a defective area is created or discovered during the process of recording data. The defect management information is recorded on the TDMA 2 when using the disc. The same defect management information is again recorded on the TDMA 1 when ejecting the disc.

As another method of using the disc, various objects are used for selecting one of a plurality of temporary defect management areas. One method of using the disc is based on significance. For example, when the significance to update the defect management information is low, the TDMA 2 may be used to record defect management information. When the significance to update the defect management information is high, the TDMA 1 (instead of the TDMA 2) may be used to record defect management information. Here, the criterion used to determine the significance can be set variously. The frequency of refreshing defect management information (updating) can be made conditional, or based on a designer's choice. The time to eject a disc may also be designated as a significant time in recording defect management information. In such a case, the time a disc is in use is regarded to be less significant so that during this time, the defect management information may be recorded on the TDMA 2 (instead of the TDMA 1). The time to eject a disc may be regarded to be more significant so that during this time, the defect management information may be recorded on the TDMA 1 (instead of the TDMA 2). The use of the TDMA 1 (or TDMA 3) is advantageous over the use of TMDA 2 (or TDMA 4) since the TDMAs 1 and 3 can be more quickly and easily accessed when the disc is loaded because they are located in the lead-in and lead-out areas, instead of the data areas. The methods that a designer decides to use are employed discriminately.

One of the criteria used to determine significance is an update interval. In other words, if the time duration between the previous defect management information update time and the present defect management information update time is long, the present update information is regarded to be relatively significant. In this case, the defect management information can be recorded on a TDMA 1 even though the disc is in use. Another criterion to determine significance is the number of defective areas created or discovered. If there are relatively many defective areas, since it is regarded that more reliability is required, defect management information may be recorded on a TDMA 1 even though the disc is in use.

According to the objectives of use, if defect management information is recorded on a TDMA according to significance, since the TDMA 1 is positioned on the inner track, significant information can be rapidly and precisely obtained, beginning from the initial time of loading the disc.

Figure 10:
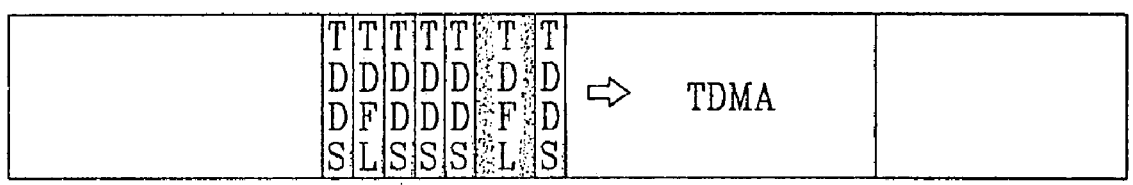
FIG. 10 illustrates an example of a temporary defect management information composition method of the present invention.
Figure 11:
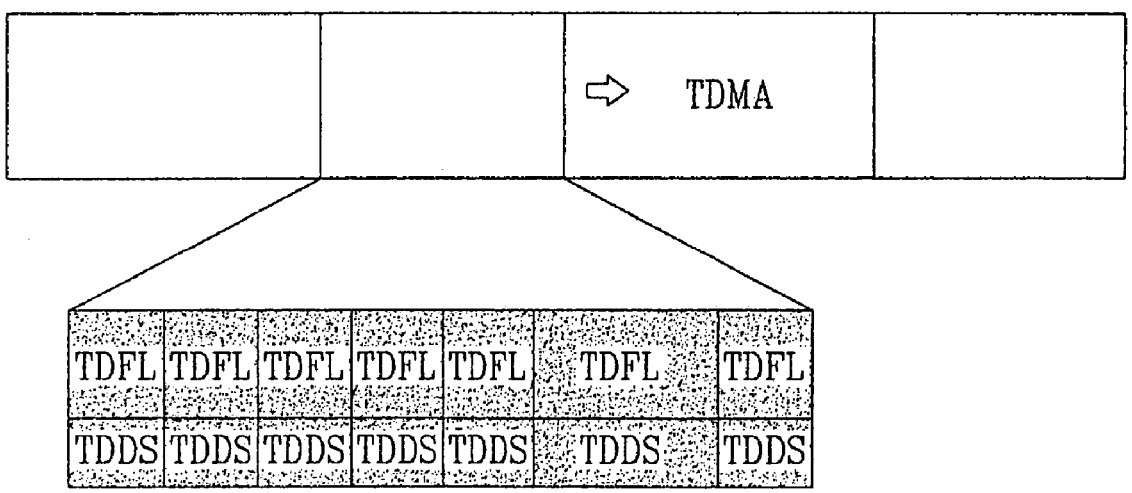
FIG. 11 illustrates another example of a temporary defect management information composition method of the present invention.

FIGS. 10 and 11 illustrate two different examples of a temporary defect management information composition method of the present invention. In one embodiment, the present invention provides a method of composing and recording defect management information on a TDMA, wherein the TDDS and the TDFL are separated from each other. Another embodiment of the present invention provides a method of composing and recording defect management information on a TDMA, wherein the TDDS and the TDFL are integrated with each other. FIG. 10 shows the former case (separated) and FIG. 11 shows the latter case (integrated). Here, each time the defect management information is updated, the latest TDFL and TDDS information is recorded in the TDMA.

Particularly, FIG. 10 illustrates a method of composing and recording defect management information on a TDMA wherein the TDDS and the TDFL are separated from each other. Each TDDS has a fixed size, e.g., 1 cluster, and the size of each TDFL is variable from, e.g., 1 cluster to 8 clusters.

FIG. 11 illustrates a method of composing and recording defect management information on a TDMA wherein the TDDS and the TDFL of the TDMA are integrated with each other. Defect management information is recorded in the form of TDFL+TDDS as shown in FIG. 11. Since the size of the TDFL can be variable from 1 cluster to 8 clusters as described above, the size of the (TDFL+TDDS) is variable from 1 cluster to 8 clusters.

Referring again to FIG. 12, the size of each TDMA (TDMA 1~TDMA 4) is indicated in the TDDS along with the TDMA full flag. According to the configuration of FIG. 4 and FIG. 5, information describing the sizes of only the TDMA 1 and TDMA 2 is provided in the TDDS. According to the configuration of FIG. 6 and FIG. 7, it is safe to write information describing the sizes of the TDMA 1, TDMA 2, TDMA 3 and TDMA 4 is provided in the TDDS. This is to say that the defect management information is recorded into a plurality of the temporary defect management areas provided in the pre-specified areas of the BD-WO according to the present invention. Therefore, the amount and types of information and bits, and the way of expressions for describing the size of the TDMA are not limited to the illustration in FIG. 12.

Referring again to FIG. 13, the 8-bit structure depicted is an example illustrating the temporary defect management area full flag. One bit of the TDMA full flag is allocated to each TDMA, e.g., from TDMA 1 to TDMA 4 as shown in FIG. 13. For instance, the TDMA full flag having a value of '00000011' indicates that the TDMAs 1 and 2 are full. The size and bit mapping are not limited to the configuration described in FIG. 13 in describing the TDMA full flag.

As shown in FIG. 13, in this example, each TDMA, from TDMA 1 to TDMA 4, corresponds to each bit from b0 to b3 of the TDMA full flag. Full flag bits for the TDMA 3 and TDMA 4 are not necessarily defined according to the disc configuration in FIG. 4 and FIG. 5. Full flag bits for the TDMA 3 and TDMA 4 may be defined according to the dual layer disc configuration shown in FIG. 6 and FIG. 7. In the dual layer BD-WO, from a logical point of view, the TDMA 2 and TDMA 4 can be used as a unified temporary defect management area. Similarly, the TDMA 1 and the TDMA 3 can be used as a unified temporary defect management area. Therefore, a method of defining the full flag may be that one full flag (or bit) is defined for TDMA 1+TDMA 3 and another full flag (or bit) is defined for TDMA 2+TDMA 4.

Accordingly, when the defect management information is recorded into a plurality of the temporary defect management areas, a system can determine whether or not writing area is available.

The present invention provides defect management methods when a defective area is discovered during data writing on a BD-WO. Particularly, writing, recording, reproducing and managing the defective area using the defect management information is realized on the BD-WO by alternatively recording the defect management information to be recorded in the defective area into the replacement area on the BD-WO and by recording the defect management information into a plurality of temporary defect management areas separately provided in the pre-specified areas of the disc.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of managing defects on an optical recording medium, the method comprising:
    allocating at least one spare area to the recording medium, and at least one temporary defect management area to the spare area when a plurality of temporary defect management areas are to be separately provided;
    recording defect management information on a first temporary defect management area;
    recording defect management information on a second temporary defect management area after the first temporary defect management area is full, the second temporary defect management area being allocated to the spare area; and
    recording the defect management information included in at least one of the first and second temporary defect management areas to at least one defect management area when the recording medium is finalized.

2. The method of claim 1, wherein the first temporary defect management area is allocated to a lead-in area of the recording medium.

3. The method of claim 1, wherein the at least one spare area includes an inner spare area and an outer spare area.

4. The method of claim 3, wherein the first temporary defect management area is allocated to a lead-in area, and the second temporary defect management area is allocated to the outer spare area.

5. The method of claim 3, wherein the first temporary defect management area is allocated to the inner spare area, and the second temporary defect management area is allocated to the outer spare area.

6. An apparatus of managing defects on an optical recording medium, the apparatus comprising:
    a recording/reproducing device configured to
        allocate at least one spare area to the recording medium, and at least one temporary defect management area to the spare area when a plurality of temporary defect management areas are to be separately provided,
        record defect management information on a first temporary defect management area,
        record defect management information on a second temporary defect management area after the first temporary defect management area is full, the second temporary defect management area being allocated to the spare area, and
        record the defect management information included in at least one of the first and second temporary defect management areas to at least one defect management area when the recording medium is finalized.

7. The apparatus of claim 6, wherein the first temporary defect management area is allocated to a lead-in area of the recording medium.

8. The apparatus of claim 6, wherein the at least one spare area includes an inner spare area and an outer spare area.

9. The apparatus of claim 8, wherein the first temporary defect management area is allocated to a lead-in area, and the second temporary defect management area is allocated to the outer spare area.

10. The apparatus of claim 8, wherein the first temporary defect management area is allocated to the inner spare area, and the second temporary defect management area is allocated to the outer spare area.

11. A recording medium, comprising:
    at least one spare area for managing defects on the recording medium; and
    a plurality of temporary defect management areas for storing defect management information, at least one temporary defect management area allocated to the spare area when the plurality of temporary defect management areas are to be separately provided,
    wherein the plurality of temporary defect management areas include a first temporary defect management area and a second temporary defect management area according to a use order, the first temporary defect management area being firstly used and the second temporary defect management area being used after the first temporary defect management area is full, the second temporary defect management area being allocated to the spare area, and wherein at least one defect management area being used for storing the defect management information included in at least one of the first and second temporary defect management areas when the recording medium is finalized.

12. The recording medium of claim 11, wherein the first temporary defect management area is allocated to a lead-in area of the recording medium.

13. The recording medium of claim 11, wherein the at least one spare area includes an inner spare area and an outer spare area.

14. The recording medium of claim 13, wherein the first temporary defect management area is allocated to a lead-in area, and the second temporary defect management area is allocated to the outer spare area.

15. The recording medium of claim 13, wherein the first temporary defect management area is allocated to the inner spare area, and the second temporary defect management area is allocated to the outer spare area.

* * * * *